United States Patent
Chaganti et al.

(10) Patent No.: US 11,388,061 B2
(45) Date of Patent: Jul. 12, 2022

(54) AUTOMATED OS NETWORKING CONFIGURATION SYSTEM

(71) Applicant: Dell Products L.P., Round Rock, TX (US)

(72) Inventors: Ravikanth Chaganti, Bangalore (IN); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 124 days.

(21) Appl. No.: 17/019,555

(22) Filed: Sep. 14, 2020

(65) Prior Publication Data

US 2022/0083348 A1 Mar. 17, 2022

(51) Int. Cl.
| | |
|---|---|
| H04L 41/00 | (2022.01) |
| H04L 41/12 | (2022.01) |
| H04L 61/5007 | (2022.01) |
| H04L 12/46 | (2006.01) |
| H04L 49/25 | (2022.01) |
| H04L 101/622 | (2022.01) |
| G06F 9/445 | (2018.01) |

(52) U.S. Cl.
CPC .......... *H04L 41/12* (2013.01); *H04L 12/4641* (2013.01); *H04L 41/20* (2013.01); *H04L 49/25* (2013.01); *H04L 61/2007* (2013.01); *G06F 9/4451* (2013.01); *H04L 61/6022* (2013.01)

(58) Field of Classification Search
CPC ... G06F 9/4451; H04L 12/4641; H04L 41/12; H04L 41/20; H04L 49/25; H04L 61/2007; H04L 61/6022
See application file for complete search history.

(56) References Cited

U.S. PATENT DOCUMENTS

| | | | |
|---|---|---|---|
| 2014/0362709 A1 | 12/2014 | Kashyap et al. | |
| 2020/0092803 A1* | 3/2020 | Presler-Marshall | H04W 24/02 |
| 2021/0144059 A1* | 5/2021 | Sundarababu | H04L 41/0876 |
| 2021/0304381 A1* | 9/2021 | Gaikwad | G06T 7/001 |

* cited by examiner

*Primary Examiner* — Tonia L Dollinger
*Assistant Examiner* — Joseph M Cousins
(74) *Attorney, Agent, or Firm* — Joseph Mencher

(57) ABSTRACT

An automated operating system networking configuration system includes a plurality of switch computing devices, a server computing device, and a management subsystem that is coupled to the plurality of switch computing devices and the server computing device. The management subsystem determines that the server computing device is connected to a plurality of switch ports, identifies that the plurality of switch computing devices include the plurality of switch ports and, in response, retrieves switch port configuration information for the plurality of switch ports from the plurality of switch devices. Based on a physical topology provided by the plurality of switch computing devices connected to the server computing device via the plurality of switch ports and the switch port configuration information for the plurality of switch ports, the management subsystem determines an operating system networking configuration and transmits the operating system networking configuration to the server computing device.

20 Claims, 11 Drawing Sheets

AUTOMATED OS NETWORKING CONFIGURATION SYSTEM

BACKGROUND

The present disclosure relates generally to information handling systems, and more particularly to automatically configuring operating system networking for an information handling system that is included in a computing device infrastructure system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes utilized to provide computing device infrastructure system such as, for example, hyper-converged infrastructure systems, which one of skill in the art in possession of the present disclosure will recognize is a software-defined Information Technology (IT) infrastructure that virtualizes the elements of conventional hardware-defined systems. For example, server computing device(s), switch computing device(s), and/or storage computing device(s) may be configured in a hyper-converged infrastructure system to provide virtualized computing functionality (e.g., via a hypervisor or other virtualized computing component), software-defined storage, and/or virtualized/software-defined networking. The conventional configuration of such computing device infrastructure systems can raise some issues.

Computing device infrastructure systems may be configured with different validated/supported networking topologies. For example, some AZURE STACK® hyper-converged infrastructures available from MICROSOFT® Corporation of Redmond, Wash., United States, support four different physical networking topologies for storage/management data traffic and virtual machine data traffic, and four variations of those physical networking topologies to support customer-specific datacenter integrations. When deploying such computing device infrastructure systems, operating system networking is configured according to the physical networking topology, but there will often be multiple possible operating system networking configurations available for any particular physical networking topology.

For example, some physical networking topologies may connect the management networking connections and the storage networking connections on a server computing device to the same network fabric provided by switch computing devices, which may require either a "fully-converged" operating system networking configuration, or a "non-converged" operating system networking configuration that utilizes "physical" or "teamed" networking adapter devices. In another example, some physical networking topologies may connect the management networking connections and the storage networking connections on a server computing device to different network fabrics provided by switch computing devices, which may require a "non-converged" operating system networking configuration that utilizes "physical" or "teamed" network adapter devices for the storage networking connections. Conventional operating system networking configuration systems operate to determine the physical networking topologies details manually, and also operate to manually determine other operating system networking configuration details such as Virtual Local Area Network (VLAN) configuration information, Quality of Service (QoS) configuration information, and/or other networking configuration details known in the art, in order to allow for the automation of the remainder of the operating system networking configuration. As such, conventional operating system networking configuration can be time-consuming with regard to the manual identification and provisioning of information as described above.

Accordingly, it would be desirable to provide an automated operating system networking configuration system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an automated operating system networking configuration engine that is configured to: determine that a server computing device is connected to a plurality of switch ports; identify a plurality of switch computing devices that include the plurality of switch ports; retrieve, in response to identifying the plurality of switch computing devices that include the plurality of switch ports, switch port configuration information for the plurality of switch ports from the plurality of switch devices; determine, based on a physical topology provided by the plurality of switch computing devices connected to the server computing device via the plurality of switch ports and the switch port configuration information for the plurality of switch ports, an operating system networking configuration; and transmit the operating system networking configuration to the server computing device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
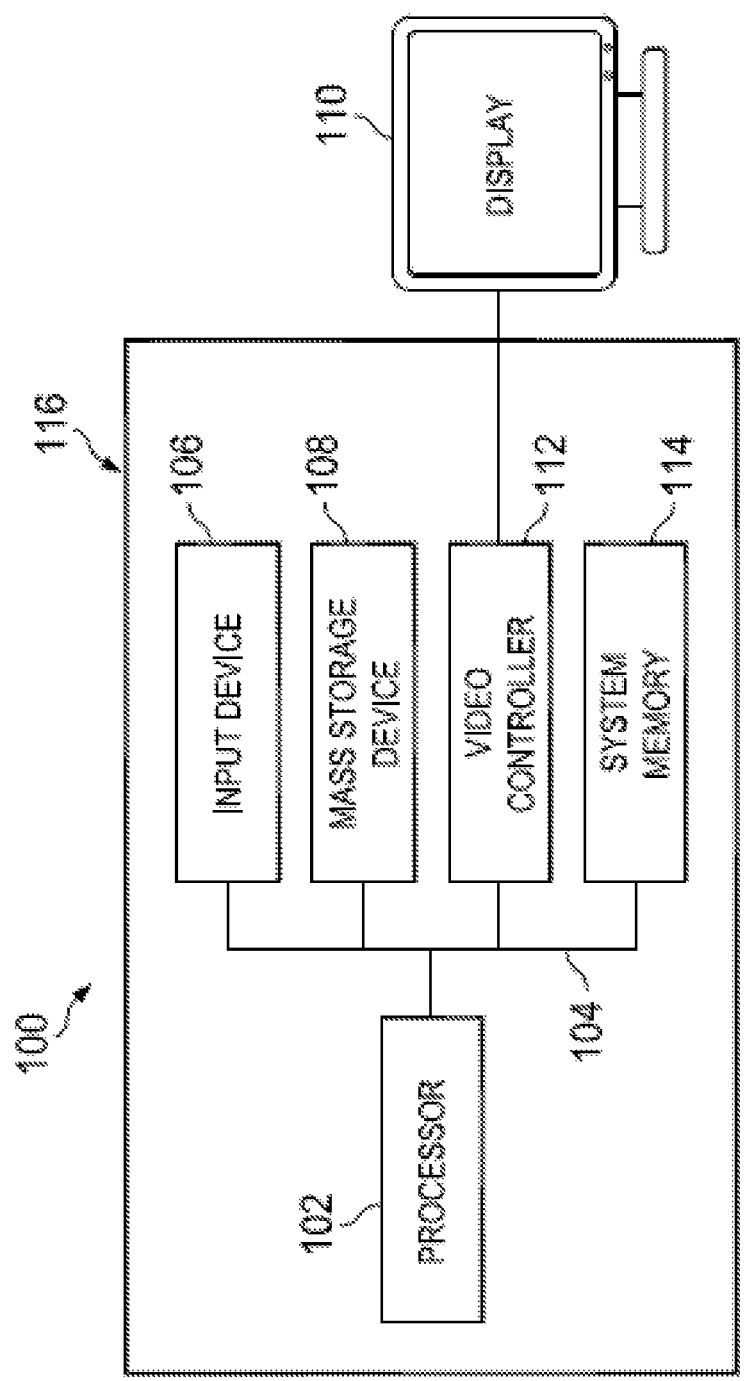
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
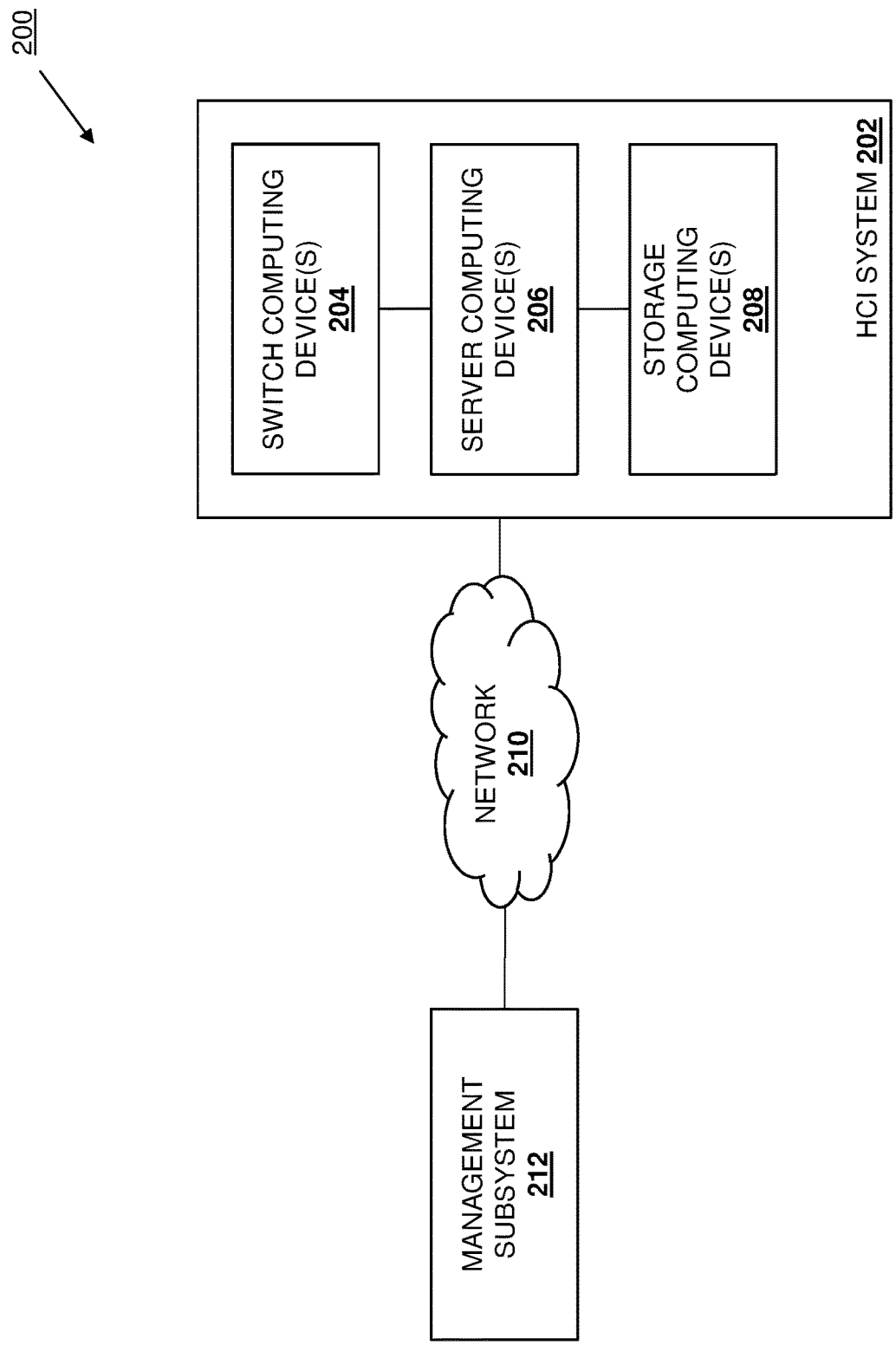
FIG. 2 is a schematic view illustrating an embodiment of an automated operating system networking configuration system.

Referring now to FIG. 2, an embodiment of an automated operating system networking configuration system 200 is illustrated. In the illustrated embodiment, the automated operating system networking configuration system 200 includes a hyper-converged infrastructure system 202 that includes one or more switch computing devices 204, one or more server computing devices 206, and one or more storage computing devices 208, each of which are coupled together and configured to operate to provide hyper-converged infrastructure functionality that virtualizes the elements of conventional hardware-defined systems via the provisioning of virtualized computing functionality (e.g., via a hypervisor or other virtualized computing component), software-defined storage, and/or virtualized/software-defined networking. However, while described in the examples below as a hyper-converged infrastructure 202, one of skill in the art in possession of the present disclosure will recognize that the hyper-converged infrastructure 202 may be replaced with a variety of computing device infrastructures known in the art. In an embodiment, any or all of the switch computing devices 204, server computing devices 206, and/or storage computing devices 208 may be provided by the IHS 100 discussed above with reference to FIG. 1, and/or may include some or all of the components of the IHS 100. In the examples below, one of the server computing devices 206 includes an operating system that has its networking configuration determined via the teachings of the present disclosure, but one of skill in the art in possession of the present disclosure will recognize that any of the switch computing devices 204, server computing devices 206, and/or storage computing devices 208 may include an operating system that may have its networking configuration determined using the teachings herein while remaining within the scope of the present disclosure as well.

In a specific example, the switch computing device(s) 204 may be provided by Top Of Rack (TOR) switch device(s) in a rack, with the server computing device(s) 206 and the storage computing device(s) 208 provided by server device (s) and storage device(s) that are included in that rack and coupled to the TOR switch device(s). However, while illustrated and discussed as being provided by TOR switch device(s), server device(s), and storage device(s), one of skill in the art in possession of the present disclosure will recognize that computing devices provided in the automated operating system networking configuration system 200 may include any devices that may be configured to operate similarly as the computing device 300 discussed below. As such, in some embodiments, any of the switch computing device(s) 204, server computing device(s) 206, and/or storage computing device(s) 208 may be omitted from the HCI system 202 while remaining within the scope of the present disclosure as well.

In the illustrated embodiment, the HCI system 202 is coupled to a network 210 that may be provided by a Local Area Network (LAN), the Internet, combinations thereof, and/or any other network that would be apparent to one of skill in the art in possession of the present disclosure. Furthermore, the illustrated embodiment includes a management subsystem 212 that is also coupled to the network 210. In an embodiment, the management subsystem 212 may be provided by the IHS 100 discussed above with reference to FIG. 1, and/or may include some or all of the components of the IHS 100, and in the specific examples discussed below may be provided by one or more server devices that are configured to perform the management subsystem functionality described below. However, while illustrated and discussed as being provided by server device(s) connected to the HCI system 202 via a network 210, one of skill in the art in possession of the present disclosure will recognize that management subsystem provided in the automated operating system networking configuration system 200 may include any devices that may be configured to operate similarly as the management subsystem 212 discussed below.

For example, in some embodiments, the management subsystem functionality described below may be performed by management controller device(s) in the switch computing device(s) 204, server computing device(s) 206, and/or storage computing device(s) 208 (e.g., an integrated DELL® Remote Access Controller (iDRAC) device available in server devices provided by DELL® Inc. of Round Rock, Tex., United States, a Baseboard Management Controller (BMC) device, and/or other management controller devices known in the art) while remaining within the scope of the present disclosure as well. Thus, while a specific automated operating system networking configuration system 200 has been illustrated and described, one of skill in the art in possession of the present disclosure will recognize that the automated operating system networking configuration system of the present disclosure may include a variety of components and component configurations while remaining within the scope of the present disclosure as well.

Figure 3A:
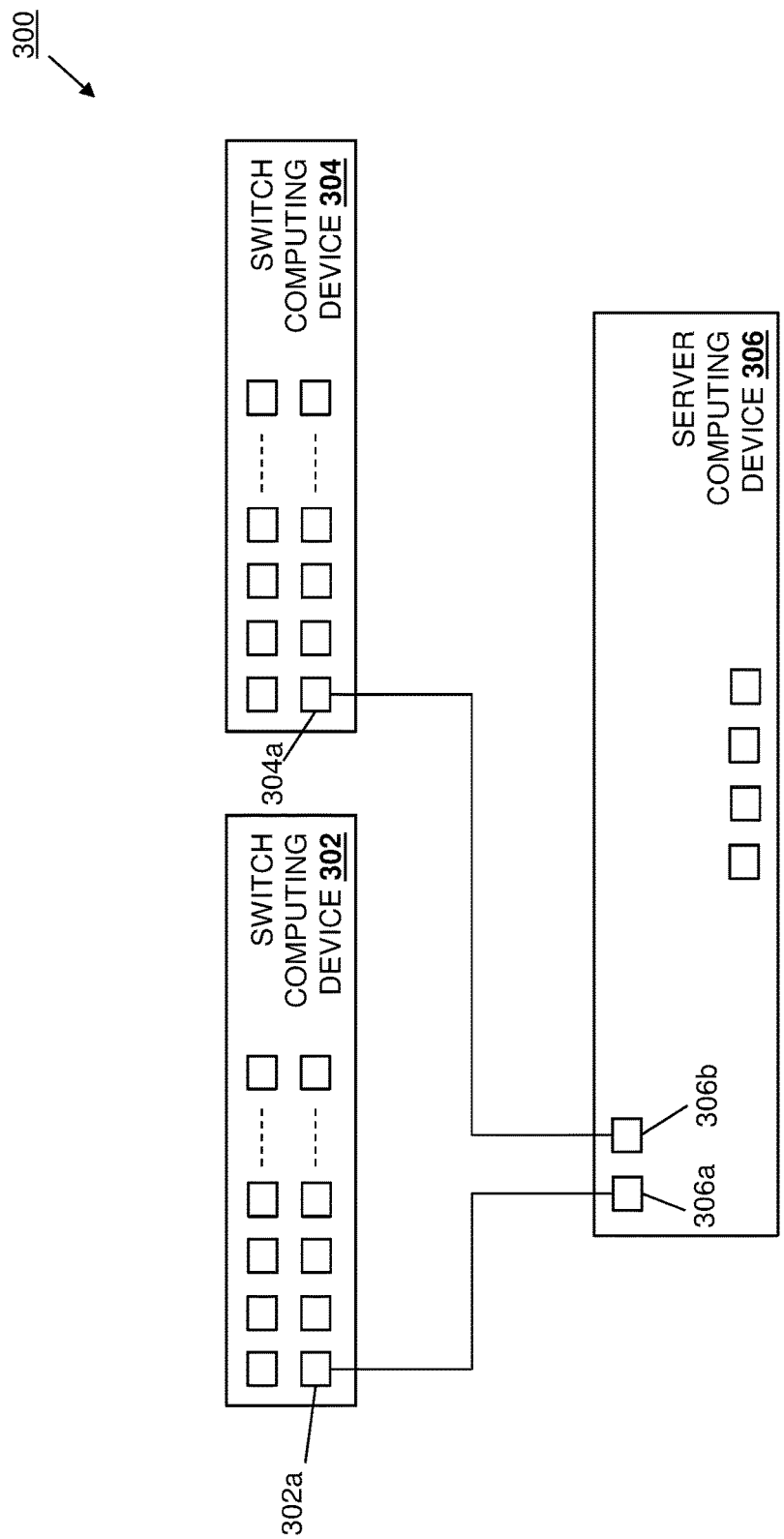
FIG. 3A is a schematic view illustrating an embodiment of a physical networking configuration that may be provided in the automated operating system networking configuration system of FIG. 2.

Referring now to FIG. 3A, an embodiment of a computing device configuration 300 is illustrated that includes a pair of switch computing devices 302 and 304 that may be provided by the switch computing devices 204 discussed above with reference to FIG. 2, and a server computing device 306 that is coupled to the switch computing devices 302 and 304 and that may be provided by the server computing device 206 discussed above with reference to FIG. 2. In the illustrated embodiment, the server computing device 306 includes a port 306a (e.g., a management port in the examples below) that is connected (e.g., via cabling such as Ethernet cabling) to a port 302a on the switch computing device 302, and a port 306b (e.g., a management port in the examples below) that is connected (e.g., via cabling such as Ethernet cabling) to a port 304a on the switch computing device 304.

In specific examples discussed in further detail below, the ports 306a and 306b on the server computing device 306 may be included on a Peripheral Component Interconnect express (PCIe) Network Interface Controller (NIC) device in the server computing device 306 (i.e., that is connected to a PCIe slot included in the server computing device 306), while other ports on the server computing device 306 (that are not utilized in the computing device configuration 300) may be included on an integrated NIC device in the server computing device 306. As discussed in the embodiments provided below, the computing device configuration 300 may include the configuration of the ports 306a and 306b on the server computing device 306 (e.g., the configuration of the PCIe NIC device in the server computing device 306) with both a management VLAN for transmitting management data traffic via the ports 306a and 306b and storage VLAN(s) for transmitting storage data traffic via the ports 306a and 306b which, as discussed below, may correspond to a "fully-converged" networking topology. However, while particular a computing device configuration 300 is illustrated and described, one of skill in the art in possession of the present disclosure will appreciate that other computing device configurations will fall within the scope of the present disclosure as well.

Figure 3B:
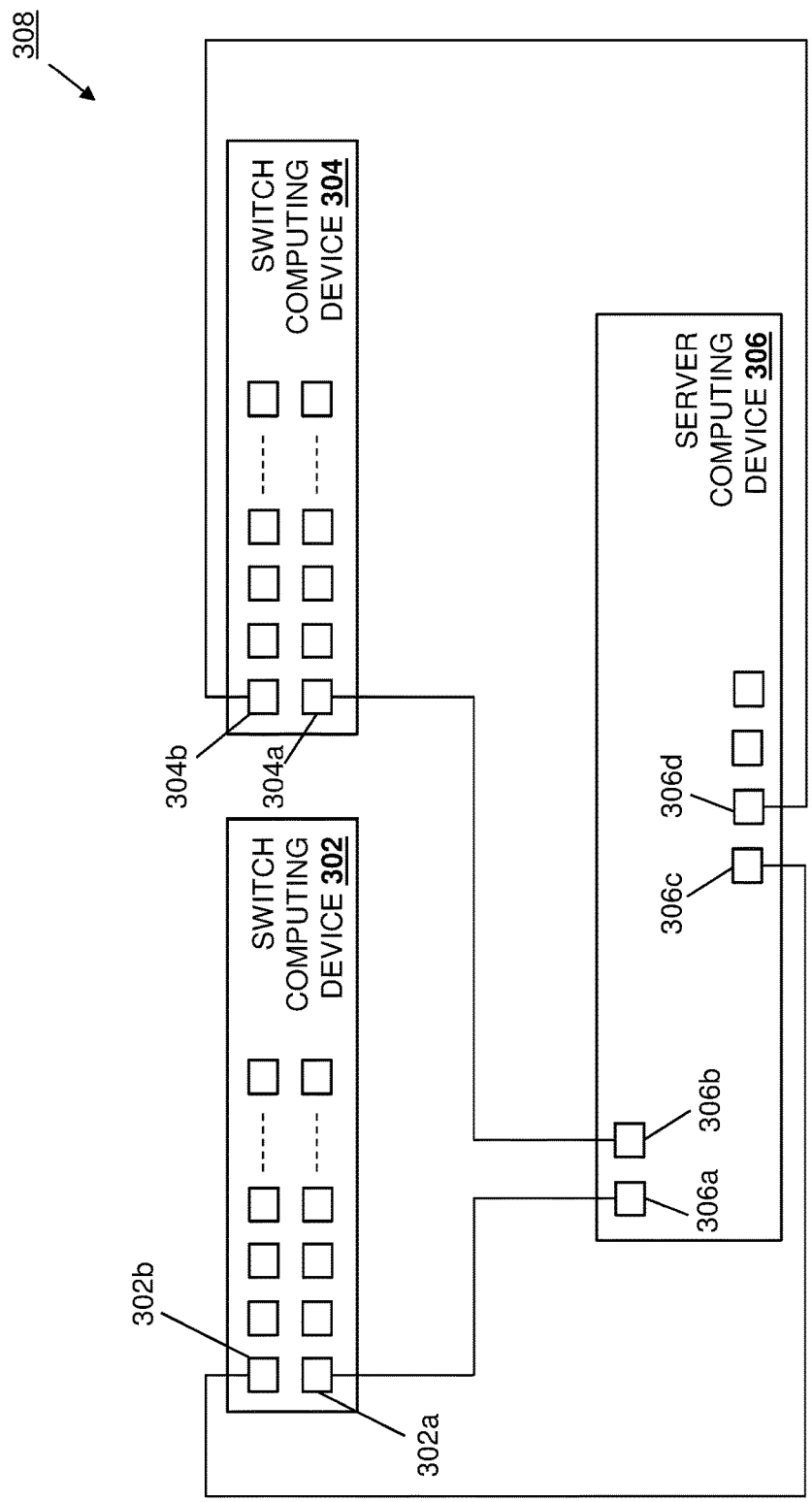
FIG. 3B is a schematic view illustrating an embodiment of a physical networking configuration that may be provided in the automated operating system networking configuration system of FIG. 2.

For example, with reference to FIG. 3B, an embodiment of a computing device configuration 308 is illustrated that includes the pair of switch computing devices 302 and 304 that may be provided by the switch computing devices 204 discussed above with reference to FIG. 2, and the server computing device 306 that is coupled to the switch computing devices 302 and 304 and that may be provided by the server computing device 206 discussed above with reference to FIG. 2. In the illustrated embodiment, the server computing device 306 includes the port 306a (e.g., a management port in the examples below) that is connected (e.g., via cabling such as Ethernet cabling) to the port 302a on the switch computing device 302, and the port 306b (e.g., a management port in the examples below) that is connected (e.g., via cabling such as Ethernet cabling) to the port 304a on the switch computing device 304. Furthermore, in the illustrated embodiment, the server computing device 306 includes a port 306c (e.g., a data port in the examples below) that is connected (e.g., via cabling such as Ethernet cabling) to a port 302b on the switch computing device 302, and a port 306d (e.g., a data port in the examples below) that is connected (e.g., via cabling such as Ethernet cabling) to a port 304b on the switch computing device 304.

Figure 3C:
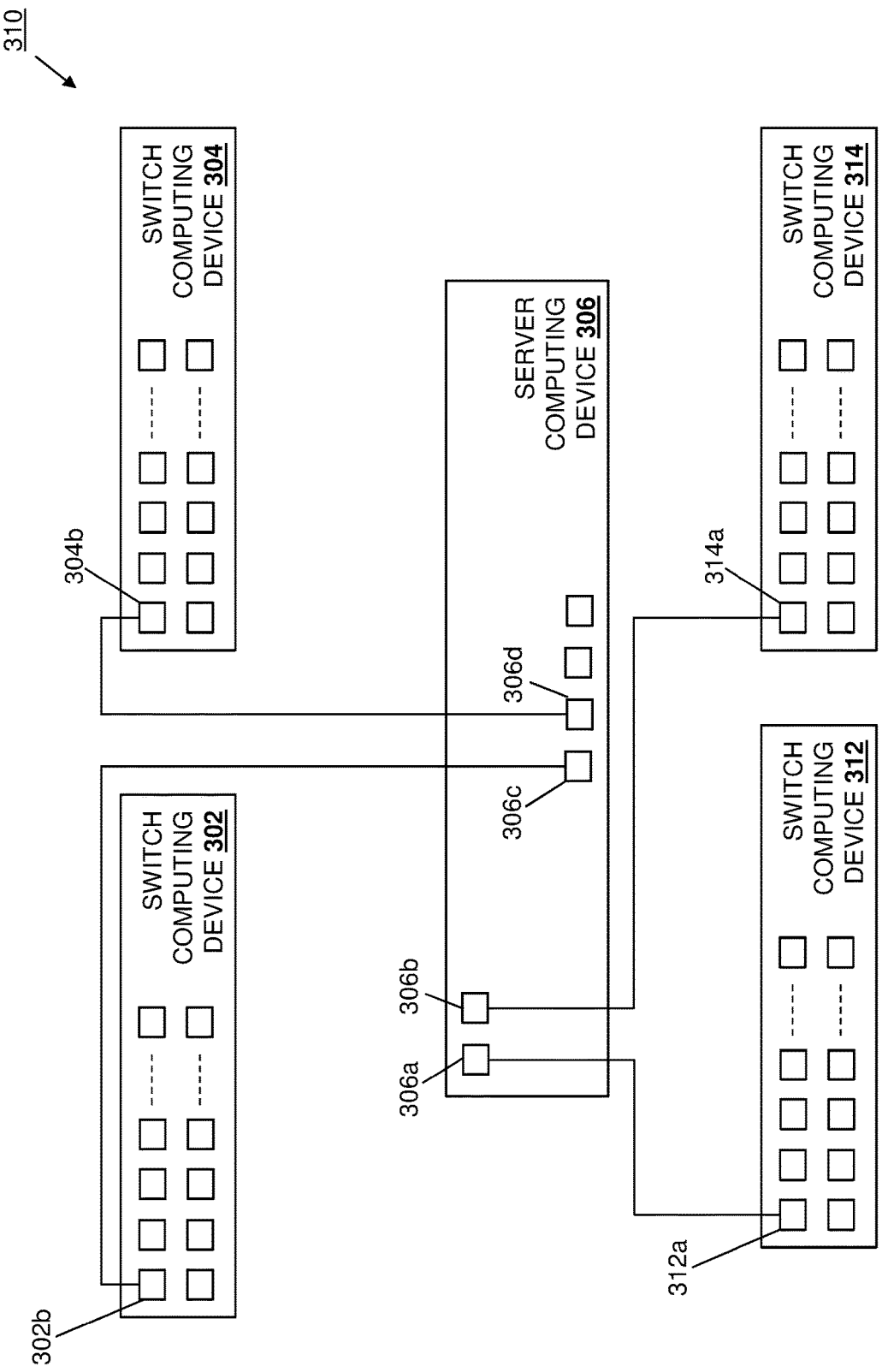
FIG. 3C is a schematic view illustrating an embodiment of a physical networking configuration that may be provided in the automated operating system networking configuration system of FIG. 2.

In specific examples discussed in further detail below, the ports 306a and 306b on the server computing device 306 may be included on a PCIe NIC device in the server computing device 306 (i.e., that is connected to a PCIe slot included in the server computing device 306), while the ports 306c and 306d on the server computing device 306 may be included on an integrated NIC device in the server computing device 306. As discussed in the embodiments provided below, the computing device configuration 308 may include the configuration of the ports 306a and 306b on the server computing device 306 (e.g., the configuration of the PCIe NIC device in the server computing device 306) with a storage VLAN(s) for transmitting storage data traffic via the ports 306a and 306b, and the configuration of the ports 306c and 306d on the server computing device 306 (e.g., the configuration of the integrated NIC device in the server computing device 306) with management VLAN(s) for transmitting management data traffic via the ports 306c and 306d which, as discussed below, may correspond to a "non-converged" networking topology. Furthermore, the configuration of the storage VLAN(s) on the ports 306a and 306b may include providing different storage VLANs on each port 306a and 306b to provide a "physical" network adapter device configuration, or providing the same storage VLAN on the ports 306a and 306b to provide a "teamed" network adapter device configuration. However, while particular a computing device configuration 308 is illustrated and described, one of skill in the art in possession of the present disclosure will appreciate that other computing device configurations will fall within the scope of the present disclosure as well For example, with reference to FIG. 3C, an embodiment of a computing device configuration 310 is illustrated that includes the pair of switch computing devices 302 and 304 that may be provided by the switch computing devices 204 discussed above with reference to FIG. 2, a pair of switch computing devices 312 and 314 that may be provided by the switch computing devices 204 discussed above with reference to FIG. 2, and the server computing device 306 that is coupled to the switch computing devices 302, 304, 312, and 314, and that may be provided by the server computing device 206 discussed above with reference to FIG. 2. In the illustrated embodiment, the server computing device 306 includes the port 306a (e.g., a management port in the examples below) that is connected (e.g., via cabling such as Ethernet cabling) to a port 312a on the switch computing device 312, and the port 306b (e.g., a management port in the examples below) that is connected (e.g., via cabling such as Ethernet cabling) to a port 314a on the switch computing device 314. Furthermore, in the illustrated embodiment, the server computing device 306 includes the port 306c (e.g., a data port in the examples below) that is connected (e.g., via cabling such as Ethernet cabling) to the port 302b on the switch computing device 302, and the port 306d (e.g., a data port in the examples below) that is connected (e.g., via cabling such as Ethernet cabling) to the port 304b on the switch computing device 304.

Figure 4:
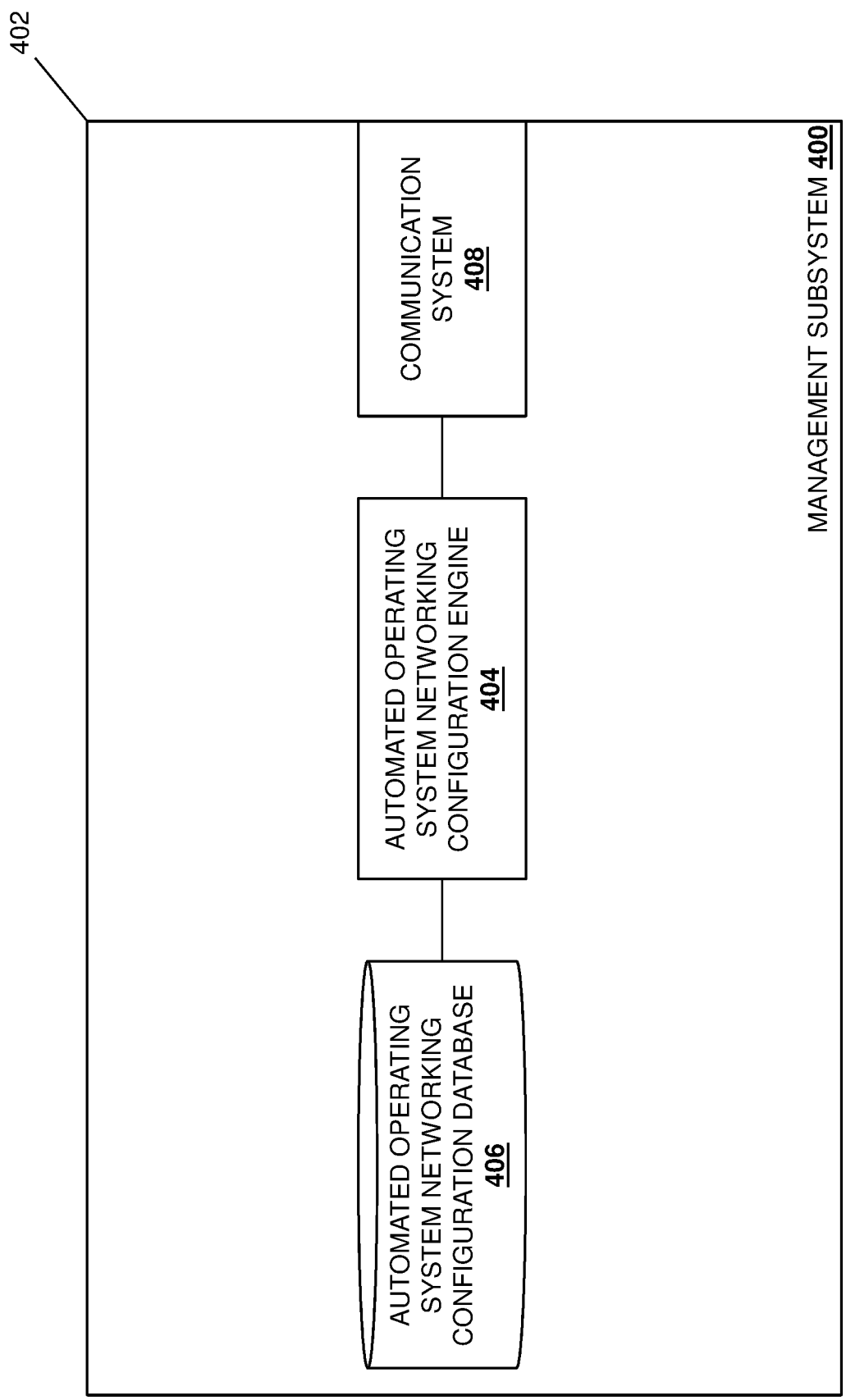
FIG. 4 is a schematic view illustrating an embodiment of a computing device that may be provided in the automated operating system networking configuration system of FIG. 2.

In specific examples discussed in further detail below, the ports 306a and 306b on the server computing device 306 may be included on a PCIe NIC device in the server computing device 306 (i.e., that is connected to a PCIe slot included in the server computing device 306), while the ports 306c and 306d on the server computing device 306 may be included on an integrated NIC device in the server computing device 306. As discussed in the embodiments provided below, the computing device configuration 308 may include the configuration of the ports 306a and 306b on the server computing device 306 (e.g., the configuration of the PCIe NIC device in the server computing device 306) with storage VLAN(s) for transmitting storage data traffic via the ports 306a and 306b, and the configuration of the ports 306c and 306d on the server computing device 306 (e.g., the configuration of the integrated NIC device in the server computing device 306) with management VLAN(s) for transmitting management data traffic via the ports 306c and 306d which, as discussed below, may correspond to a "non-converged" networking topology. Furthermore, the configuration of the storage VLAN(s) on the ports 306a and 306b may include providing different storage VLANs on each port 306a and 306b to provide a "physical" network adapter device configuration, or providing the same storage VLAN on the ports 306a and 306b to provide a "teamed" network adapter device configuration. However, while particular a computing device configuration 310 is illustrated and described, one of skill in the art in possession of the present disclosure will appreciate that other computing device configurations will fall within the scope of the present disclosure as well Referring now to FIG. 4, an embodiment of a management subsystem 400 is illustrated that may provide the management subsystem 212 discussed above with reference to FIG. 2, or in any of the any of the switch computing device(s) 204, server computing device(s) 206, and/or storage computing device(s) 208 discussed above with reference to FIG. 2. As such, the management subsystem 400 may be provided by the IHS 100 discussed above with reference to FIG. 1 and/or may include some or all of the components of the IHS 100, and in specific examples may be provided by one or more server devices connected to the network 210, or may be provided by a management controller device (e.g., the iDRAC® or BMC discussed above) in one of the server computing devices 206. However, while illustrated and discussed as being provided by specific devices in many of the examples below, one of skill in the art in possession of the present disclosure will recognize that the functionality of the management subsystem 400 discussed below may be provided by other devices that are configured to operate similarly as the management subsystem 400 discussed below.

In the illustrated embodiment, the management subsystem 400 includes a chassis 402 that houses the components of the management subsystem 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an automated operating system networking configuration engine 404 that is configured to perform the functionality of the automated operating system networking configuration engines and/or management subsystems discussed below.

The chassis 402 may also house a storage system (not illustrated, but which may include the storage 108 discussed above with reference to FIG. 1) that is coupled to the automated operating system networking configuration engine 404 (e.g., via a coupling between the storage system and the processing system) and that includes an automated operating system networking configuration database 406 that is configured to store any of the information utilized by the automated operating system networking configuration engine 404 discussed below. The chassis 402 may also house a communication system 408 that is coupled to the automated operating system networking configuration engine 404 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific management subsystem 400 has been illustrated, one of skill in the art in possession of the present disclosure will recognize that c management subsystem (or other devices operating according to the teachings of the present disclosure in a manner similar to that described below for the management subsystem 400) may include a variety of components and/or component configurations for providing conventional management subsystem functionality, as well as the functionality discussed below, while remaining within the scope of the present disclosure as well.

Figure 5:
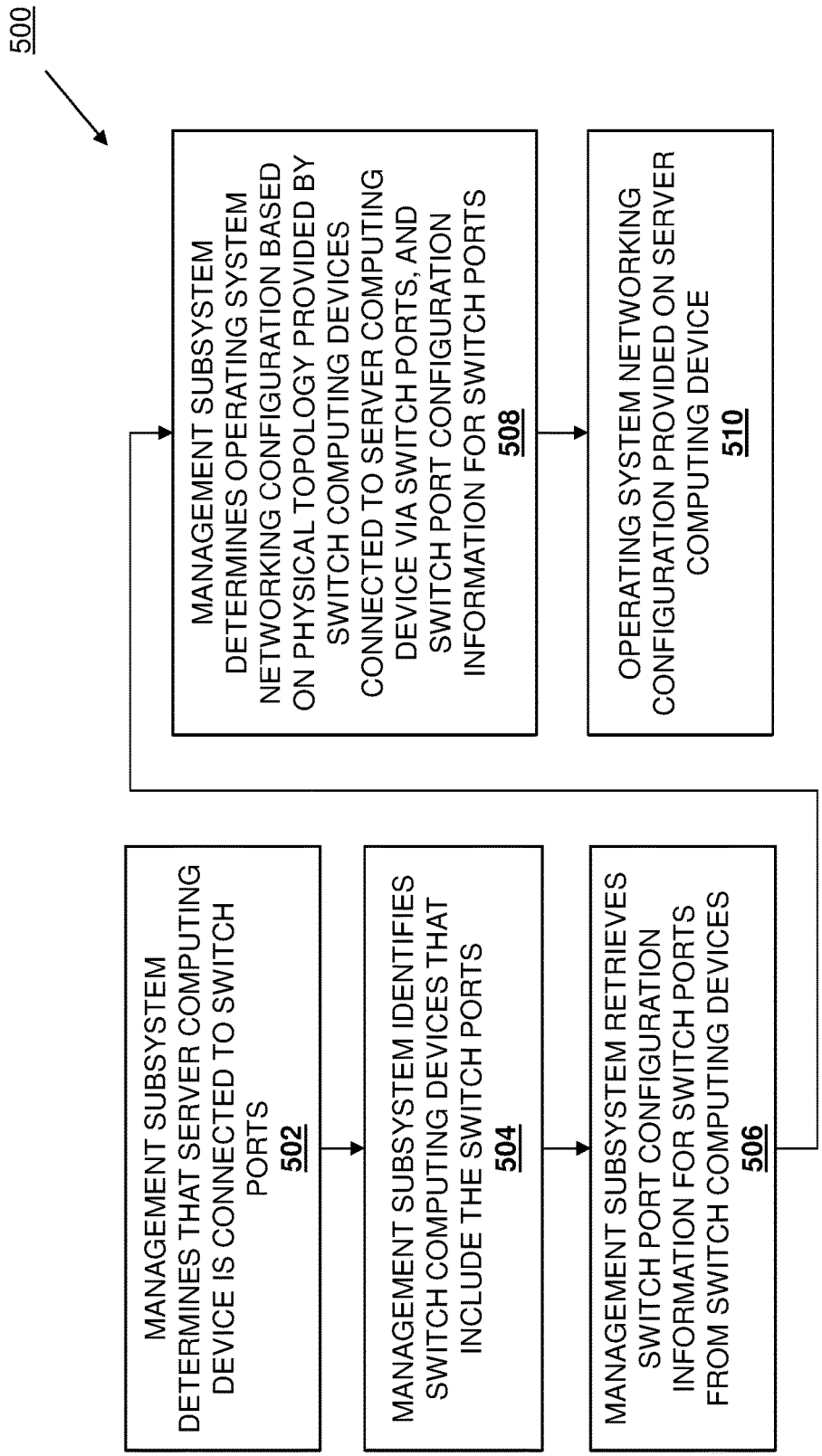
FIG. 5 is a flow chart illustrating an embodiment of a method for automatically configuring networking in an operating system.

Referring now to FIG. 5, an embodiment of a method 500 for automatically configuring networking in an operating system is illustrated. As discussed below, the systems and methods of the present disclosure provide automated operating system networking configuration recommendations for an operating system in a server computing device based on a physical networking topology of the server computing device and its connected switch computing devices, and port configuration information retrieved from those switch computing devices. For example, the automated operating system networking configuration system of the present disclosure includes a management subsystem coupled to a plurality of switch computing devices and a server computing device. The management subsystem determines that the server computing device is connected to a plurality of switch ports, identifies that the plurality of switch computing devices include the plurality of switch ports and, in response, retrieves switch port configuration information for the plurality of switch ports from the plurality of switch devices. Based on a physical topology provided by the plurality of switch computing devices connected to the server computing device via the plurality of switch ports and the switch port configuration information for the plurality of switch ports, the management subsystem determines an operating system networking configuration, and transmit the operating system networking configuration to the server computing device. As such, operating system networking configurations may be determined automatically, reducing the time and costs associated with the configuration of operating system networking in a server computing device.

In some embodiments, the server computing devices 206 in the hyper-converged infrastructure system 202 may be discovered by the management subsystem 212 (or other device providing the management subsystem functionality discussed below) as described by the inventors of the present disclosure in U.S. patent application Ser. No. 17/019,714, filed on Sep. 14, 2020, the disclosure of which is incorporated herein in its entirety. As such, as described in that patent application, the management subsystem 212 may broadcast a discovery request that is configured to cause only the server computing devices 206 in the hyper-converged infrastructure system 202 to respond with identity information for those server computing devices 206, which allows the management subsystem 212 to discovery those server computing devices 206.

Figure 6A:
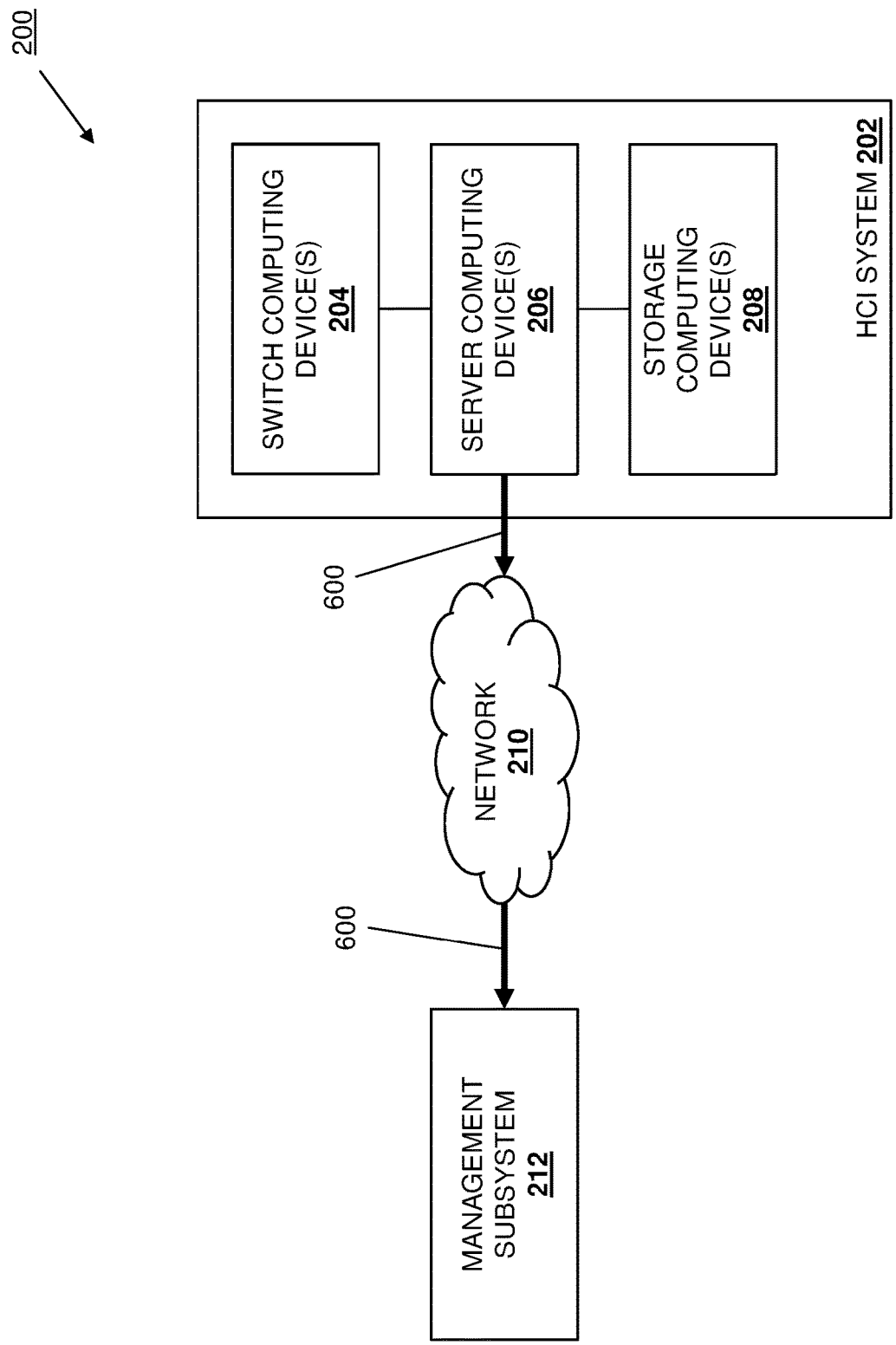
FIG. 6A is a schematic view illustrating an embodiment of the automated operating system networking configuration system of FIG. 2 operating during the method of FIG. 5.

The method 500 begins at block 502 where a management subsystem determines a server computing device is connected to switch ports. With reference to FIG. 6A, in an embodiment of block 502, the server computing device 206 may perform server connectivity identification operations 600 that may include the generation of server connectivity identification information and the transmission of that server connectivity identification information via the network 210 to the management computing device 212. For example, the server connectivity identification information may be generated and transmitted by a management controller device in the server computing device 206 (e.g., an iDRAC®, device, BMC, device, or other management controller device as discussed above) via Link Layer Discovery Protocol (LLDP) Type-Length-Value (TLV) data structures, and one of skill in the art in possession of the present disclosure will recognize how LLDP TLV data structures may be generated that provide identifying information about switch ports connected to NIC devices in server computing devices. As such, in an embodiment of block 502, the automated operating system networking configuration engine 404 in the management subsystem 212/400 may receive the server connectivity identification information (e.g., provided in LLDP TVL data structures as discussed above) via its communication system 408. However, as discussed above, in some embodiments the management subsystem functionality described herein as being provided by the network-connected management subsystem 212 may instead be provided by a management controller device in the server computing device 206, and thus at block 502 that management controller device in the server computing device 206 may retrieve the server connectivity identification information from its server computing device 206 while remaining within the scope of the present disclosure as well.

In an embodiment, at block 502, the automated operating system networking configuration engine 404 in the management subsystem 212/400 may operate to interpret the server connectivity identification information in LLDP TVL data structures received from the server computing device 206 (e.g., using custom scripts) in order to determine switch ports that are connected to the server device 206. An example of server connectivity identification information interpreted from LLDP TVL data structures received from the server computing device 206 is provided below:

| NETWORK ADAPTER IDENTIFIER | SWITCH PORT MAC ADDRESS | SWITCH PORT IP ADDRESS | LINK STATUS |
|---|---|---|---|
| NIC.Integrated.1-1-1 | No Link | No Link | LinkDown |
| NIC.Integrated.1-4-1 | No Link | No Link | LinkDown |
| NIC.Integrated.1-2-1 | No Link | No Link | LinkDown |
| NIC.Integrated.1-3-1 | Not Supported | Not Supported | LinkDown |
| NIC.Slot.1-1-1 | 20:04:0f:25:76:a8 | Ethernet 1/1/6 | LinkUp |
| NIC.Slot.1-2-1 | 20:04:0f:25:70:a8 | Ethernet 1/1/6 | LinkUp |

As will be appreciated by one of skill in the art in possession of the present disclosure, the example of the server connectivity identification information provided above includes some information about switch ports connected to NIC devices in the server computing device 206, but does not convey any information about which of the switch computing devices 204 are connected to the server computing device 206. In other words, the server connectivity identification information interpreted from LLDP TVL data structures received from the server computing device 206 in the example provided above identifies that an integrated NIC device in the server computing device 206 is not connected to any switch ports, while a PCIe NIC device in the server computing device 206 is connected to a switch port with a MAC address "20:04:0f:25:76:a8" and an IP address "Ethernet 1/1/16", and a switch port with a MAC address "20:04:0f:25:70:a8" and an IP address "Ethernet 1/1/16", but there is no information about which switch computing device(s) 206 upon which those switch ports are included. Furthermore, while a specific example of server connectivity identification information is provided above, one of skill in the art in possession of the present disclosure will appreciate that server connectivity identification information will vary depending on the physical connections between the server computing device providing that server connectivity identification information and corresponding switch ports to which that server computing device is connected.

Figure 6B:
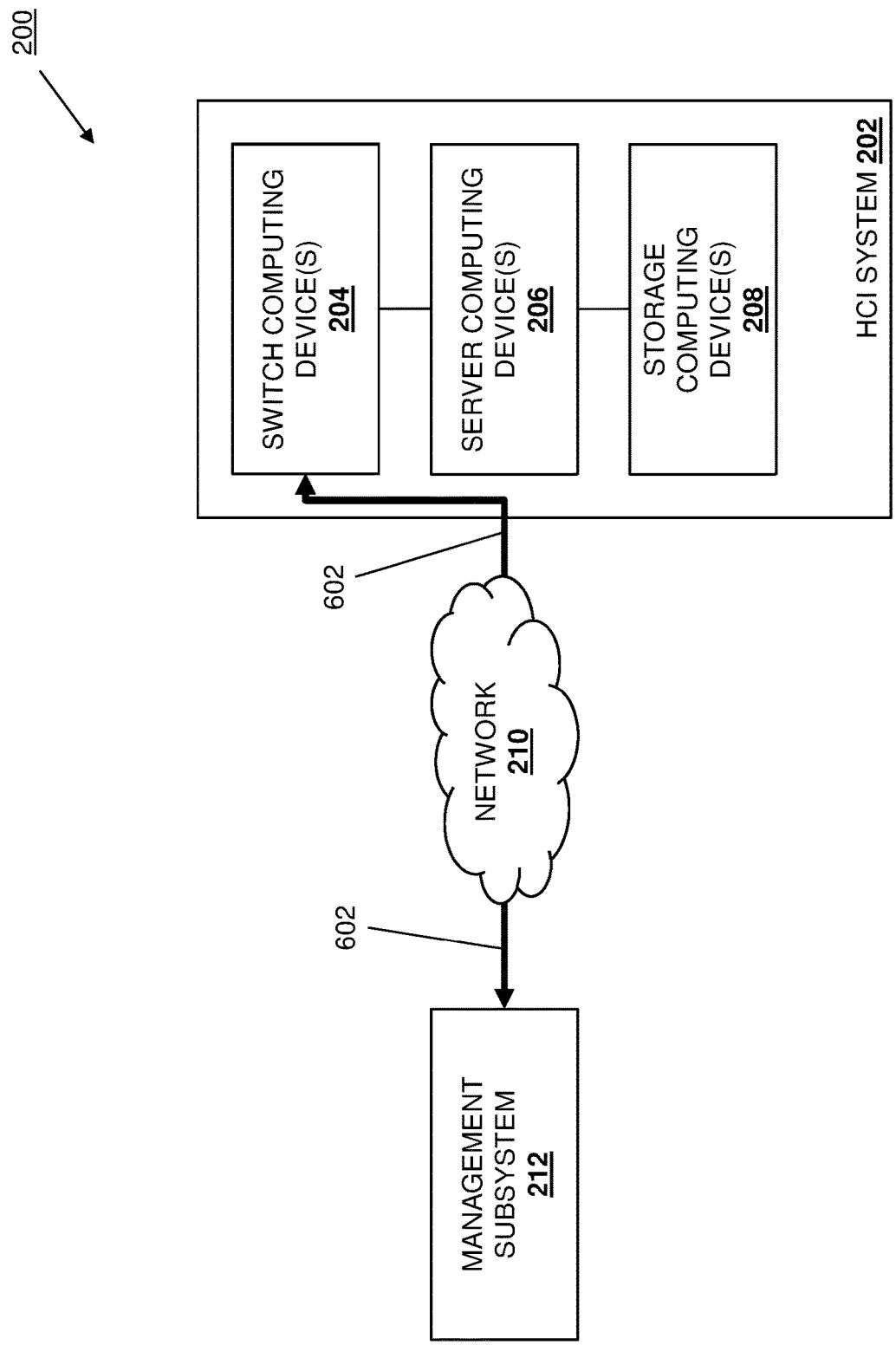
FIG. 6B is a schematic view illustrating an embodiment of the automated operating system networking configuration system of FIG. 2 operating during the method of FIG. 5.

The method 500 then proceeds to block 504 where the management subsystem identifies switch computing devices that include the switch ports. With reference to FIG. 6B, in an embodiment of block 504, the automated operating system networking configuration engine 404 in the management subsystem 212/400 may perform switch identification operations 602 that may include exchanging communications with the switch computing device(s) 204 in order to identify which of the switch computing device(s) 204 include the switch ports that it determined were connected to the server computing device 206 at block 502. However, similarly as discussed above, in some embodiments the management subsystem functionality described herein as being provided by the network-connected management subsystem 212 may instead be provided by a management controller device in the server computing device 206, and thus at block 504 that management controller device in the server computing device 206 may exchange communications with the switch computing device(s) 204 in order to identify which of the switch computing device(s) 204 include the switch ports that it determined were connected to the server computing device 206 at block 502 while remaining within the scope of the present disclosure as well.

In some embodiments, the management subsystem 212 may be part of a "trust domain" for the hyper-converged infrastructure system 202 that is described by the inventors of the present disclosure in U.S. patent application Ser. No. 17/019,523, filed on Sep. 14, 2020, the disclosure of which is incorporated herein by reference. As such, as described in that patent application, the management subsystem 212 may be configured to utilize authentication information and a computing device component hash value to have its communications validated by the switch computing device(s) 204 to confirm that the management subsystem 212 is part of the trust domain for the hyper-converged infrastructure system 202, which allows those switch computing devices 204 to share information with the management subsystem 212 in a secure manner and without the need for credentials or certificates that are required to secure communications in conventional hyper-converged infrastructure systems. Thus, the communications exchanged by the management subsystem 212 with the switch computing devices 204 at block 504 in order to identify which of the switch computing device(s) 204 include the switch ports that it determined were connected to the server computing device 206 at block 502 may be performed as part of a trust domain, and may utilize switch configuration Application Programming Interface(s) (API(s)) provided by the switch computing devices 204 that allow access to that switch configuration information for trusted devices and/or subsystems. As will be appreciated by one of skill in the art in possession of the present disclosure, the switch configuration APIs discussed above may provide access to any switch port inventory information stored in the switch computing devices 204.

As such, in an embodiment of block 504, the automated operating system networking configuration engine 404 in the management subsystem 212/400 may identify each switch computing device 204 that includes a switch port that is connected to the NIC device(s) in the server computing device 206. For example, the automated operating system networking configuration engine 404 in the management subsystem 212/400 may perform the switch identification operations 602 at block 504 to identify each switch device that includes a switch port that utilizes a MAC address that was identified in the server connectivity identification information (e.g., the MAC addresses "20:04:0f:25:76:a8" and "20:04:0f:25:70:a8") provided in the specific example above. Thus, with reference to the computing device configuration 300 discussed above with reference to FIG. 3A, the automated operating system networking configuration engine 404 in the management subsystem 212/400 may identify that the switch computing devices 302/204 and 304/204 include the switch ports 302a and 304a having MAC addresses that were determined to be connected to the ports 306a and 306b, respectively, on the PCIe NIC device in the server computing device 206/306 at block 502.

Similarly, with reference to the computing device configuration 308 discussed above with reference to FIG. 3B, the automated operating system networking configuration engine 404 in the management subsystem 212/400 may identify that the switch computing devices 302/204 and 304/204 include the switch ports 302a and 304a having MAC addresses that were determined to be connected to the ports 306a and 306b, respectively, on the PCIe NIC device in the server computing device 206/306 at block 502, and that the switch computing devices 302/204 and 304/204 include the switch ports 302b and 304b having MAC addresses that were determined to be connected to the ports 306c and 306d, respectively, on the integrated NIC device in the server computing device 206/306 at block 502. Similarly, with reference to the computing device configuration 310 discussed above with reference to FIG. 3C, the automated operating system networking configuration engine 404 in the management subsystem 212/400 may identify that the switch computing devices 302/204 and 304/204 include the switch ports 302b and 304b having MAC addresses that were determined to be connected to the ports 306c and 306d, respectively, on the integrated NIC device in the server computing device 206/306 at block 502, and that the switch computing devices 312/204 and 314/204 include the switch ports 312a and 314a having MAC addresses that were determined to be connected to the ports 306a and 306b, respectively, on the PCIe NIC device in the server computing device 206/306 at block 502. However, while a few specific examples are provided, one of skill in the art in possession of the present disclosure will appreciate that switch computing devices may be connected to a server computing device via their switch ports in a variety of configurations that may be identified at block 504 while remaining within the scope of the present disclosure as well.

Figure 6C:
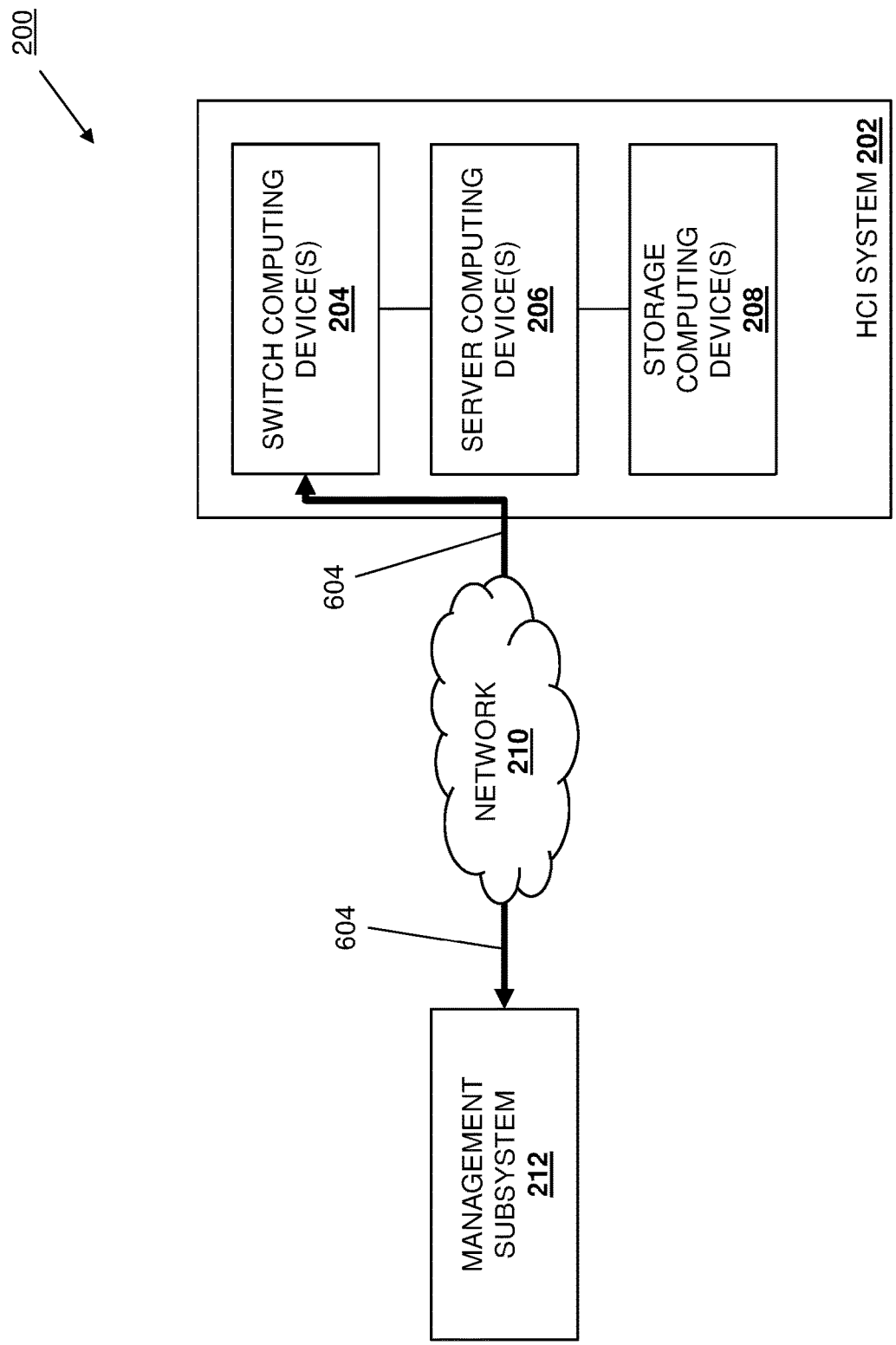
FIG. 6C is a schematic view illustrating an embodiment of the automated operating system networking configuration system of FIG. 2 operating during the method of FIG. 5.

The method 500 then proceeds to block 506 where the management subsystem retrieves switch port configuration information for the switch ports from the switch computing devices. With reference to FIG. 6C, in an embodiment of block 506, the automated operating system networking configuration engine 404 in the management subsystem 212/400 may perform switch port configuration retrieval operations 604 that may include exchanging communications with the switch computing device(s) 204 in order to retrieve switch port configuration information provided on the switch computing device(s) 204 identified as including the switch ports that are connected to the server computing device 206 at block 504. However, similarly as discussed above, in some embodiments the management subsystem functionality described herein as being provided by the network-connected management subsystem 212 may instead be provided by a management controller device in the server computing device 206, and thus at block 506 that management controller device in the server computing device 206 may exchange communications with the switch computing device(s) 204 in order to retrieve switch port configuration information provided on the switch computing device(s) 204 identified as including the switch ports that are connected to the server computing device 206 at block 504 while remaining within the scope of the present disclosure as well.

Similarly as discussed above with reference to block 504, the communications exchanged by the management subsystem 212 with the switch computing devices 204 at block 506 in order to retrieve switch port configuration information provided on the switch computing device(s) 204 identified as including the switch ports that are connected to the server computing device 206 at block 504 may be performed as part of a trust domain, and may utilize switch configuration Application Programming Interface(s) (API(s)) provided by the switch computing devices 204 that allow access to that switch configuration information for trusted devices and/or subsystems. As will be appreciated by one of skill in the art in possession of the present disclosure, the switch configuration APIs discussed above may provide access to any switch port configuration parameter information stored in the switch computing devices 204. As such, in an embodiment of block 506, the automated operating system networking configuration engine 404 in the management subsystem 212/400 may retrieve switch port configuration information from each switch computing device 204 that includes a switch port that is connected to the NIC device(s) in the server computing device 206, and that switch port configuring information may include Virtual Local Area Network (VLAN) assignment information provided for those switch ports, Quality of Service (QoS) configuration information provided for those switch ports, and/or any other switch port configuration information that would be apparent to one of skill in the art in possession of the present disclosure.

For example, the automated operating system networking configuration engine 404 in the management subsystem 212/400 may perform the switch port configuration retrieval operations 604 at block 506 to retrieve switch port configuration information from each switch device that includes a switch port that utilizes a MAC address that was identified in the server connectivity identification information (e.g., the MAC addresses "20:04:0f:25:76:a8" and "20:04:0f:25:70:a8") provided in the specific example above. Thus, with reference to the computing device configuration 300 discussed above with reference to FIG. 3A and for purposes of a specific example provided below, the automated operating system networking configuration engine 404 in the management subsystem 212/400 may retrieve switch port configuration information from the switch computing devices 302/204 and 304/204 for the switch ports 302a and 304a (which have MAC addresses that were determined to be connected to the ports 306a and 306b, respectively, on the PCIe NIC device in the server computing device 206/306 at block 502), and that switch port configuration information may include one or more common management VLAN identifiers for each of the switch ports 302a and 304a that indicates that the same management VLAN(s) are provided on each of the switch ports 302a and 304a, and one or more common storage VLAN identifier(s) for each of the switch ports 302a and 304a that indicates that the same storage VLAN(s) are provided on each of the switch ports 302a and 304a.

Similarly, with reference to the computing device configuration 308 discussed above with reference to FIG. 3B and for purposes of a specific example provided below, the automated operating system networking configuration engine 404 in the management subsystem 212/400 may retrieve switch port configuration information from the switch computing devices 302/204 and 304/204 for the switch ports 302a and 304a (which have MAC addresses that were determined to be connected to the ports 306a and 306b, respectively, on the PCIe NIC device in the server computing device 206/306 at block 502), and that switch port configuration information may include one or more storage VLAN identifiers for each of the switch ports 302a and 304a that indicates that storage VLAN(s) are provided on each of the switch ports 302a and 304a. Furthermore, the automated operating system networking configuration engine 404 in the management subsystem 212/400 may also retrieve switch port configuration information from the switch computing devices 302/204 and 304/204 for the switch ports 302b and 304b (which have MAC addresses that were determined to be connected to the ports 306c and 306d, respectively, on the integrated NIC device in the server computing device 206/306 at block 502), and that switch port configuration information may include one or more management VLAN identifiers for each of the switch ports 302b and 304b that indicates that management VLAN(s) are provided on each of the switch ports 302b and 304b.

Similarly, with reference to the computing device configuration 310 discussed above with reference to FIG. 3C and for purposes of a specific example provided below, the automated operating system networking configuration engine 404 in the management subsystem 212/400 may retrieve switch port configuration information from the switch computing devices 302/204 and 304/204 for the switch ports 302b and 304b (which have MAC addresses that were determined to be connected to the ports 306c and 306d, respectively, on the integrated NIC device in the server computing device 206/306 at block 502), and that switch port configuration information may include one or more management VLAN identifiers for each of the switch ports 302b and 304b that indicates that management VLAN(s) are provided on each of the switch ports 302b and 304b. Furthermore, the automated operating system networking configuration engine 404 in the management subsystem 212/400 may also retrieve switch port configuration information from the switch computing devices 312/204 and 314/204 for the switch ports 312a and 314a (which have MAC addresses that were determined to be connected to the ports 306a and 306b, respectively, on the PCIe NIC device in the server computing device 206/306 at block 502), and that switch port configuration information may include one or more storage VLAN identifiers for each of the switch ports 312a and 314a that indicates that storage VLAN(s) are provided on each of the switch ports 312a and 314a. However, while a few specific examples are provided, one of skill in the art in possession of the present disclosure will appreciate that switch computing devices may include a variety of switch port configurations for their switch ports that may be retrieved at block 506 while remaining within the scope of the present disclosure as well.

The method 500 then proceeds to block 508 where the management subsystem determines an operating system networking configuration based on a physical topology provided by the switch computing devices connected to the server computing device via the switch ports, and the switch port configuration information for the switch ports. In an embodiment, at block 508, the automated operating system networking configuration engine 404 in the management subsystem 212/400 may utilize a physical topology that is defined by the connections provided between the server computing device 206 and the switch computing devices 204, along with the switch port configuration information for the switch ports that connect the switch computing devices 204 to the server computing device 206, in order to determine an operating system networking configuration for the server computing device 206. However, similarly as discussed above, in some embodiments the management subsystem functionality described herein as being provided by the network-connected management subsystem 212 may instead be provided by a management controller device in the server computing device 206, and thus at block 508 that management controller device in the server computing device 206 may utilize the physical topology that is defined by the connections provided between the server computing device 206 and the switch computing devices 204, along with the switch port configuration information for the switch ports that connect the switch computing devices 204 to the server computing device 206, in order to determine an operating system networking configuration for the server computing device 206 while remaining within the scope of the present disclosure as well.

In a specific example, with reference to the computing device configuration 300 discussed above with reference to FIG. 3A, the automated operating system networking configuration engine 404 in the management subsystem 212/400 may identify the physical topology provided by the connection of the switch computing device 204/302 to the server computing device 206/306 via the ports 302a and 306a, respectively, and the connection of the switch computing device 204/304 to the server computing device 206/306 via the ports 304a and 306b, respectively. With reference to the specific example of switch port configuration information provided above for the computing device configuration 300, the automated operating system networking configuration engine 404 in the management subsystem 212/400 may then determine that the physical topology for the computing device configuration 300, combined with the switch port configuration information that indicates that the same management VLAN(s) are provided on each of the switch ports 302a and 304a (connected to the ports 306a and 306b on the server computing device 206/306, respectively) and the same storage VLAN(s) are provided on each of the switch ports 302a and 304a (connected to the ports 306a and 306b on the server computing device 206/306, respectively), provides a fully converged networking topology for the computing device configuration 300 (e.g., because all management VLAN(s) and storage VLAN(s) are "tagged" or otherwise assigned across the PCIe NIC device in the server computing device 206/306).

In response, at block 508 the automated operating system networking configuration engine 404 in the management subsystem 212/400 may determine that an operating system networking configuration for a fully converged networking topology should be provided for the operating system (e.g., a "host" operating system) utilized by the server computing device 206/306 in the computing device configuration 300. Furthermore, that operating system networking configuration may include or enable the QoS configuration information discussed above, as well as any other configuration information retrieved during the method 500. However, while a specific example of the determination of a operating system networking configuration for a fully converged networking topology provided by a particular physical topology has been provided, one of skill in the art in possession of the present disclosure will recognize that other computing device configurations may provide a fully converged networking topology while remaining within the scope of the present disclosure as well.

In another specific example, with reference to the computing device configuration 308 discussed above with reference to FIG. 3B, the automated operating system networking configuration engine 404 in the management subsystem 212/400 may identify the physical topology provided by the connection of the switch computing device 204/302 to the server computing device 206/306 via the ports 302a and 306a, respectively, and ports 302b and 306c, respectively, and the connection of the switch computing device 204/304 to the server computing device 206/306 via the ports 304a and 306b, respectively, and ports 304b and 306d, respectively. With reference to the specific example of switch port configuration information provided above for the computing device configuration 308, the automated operating system networking configuration engine 404 in the management subsystem 212/400 may then determine that the physical topology for the computing device configuration 308, combined with the switch port configuration information that indicates that management VLAN(s) are provided on each of the switch ports 302b and 304b (connected to the ports 306c and 306d on the server computing device 206/306, respectively) and that the storage VLAN(s) are provided on each of the switch ports 302a and 304a (connected to the ports 306a and 306b on the server computing device 206/306, respectively), provides a non-converged networking topology for the computing device configuration 308 (e.g., because management VLAN(s) are "tagged" or otherwise assigned to the integrated NIC device in the server computing device 206/306, and the storage VLAN(s) are "tagged" or otherwise assigned to the PCIe NIC device in the server computing device 206/306).

In an embodiment, in response to determining that the computing device configuration 310 provides a non-converged networking topology, the automated operating system networking configuration engine 404 in the management subsystem 212/400 may determine whether "physical" or "teamed" network adapter devices (NIC devices) should be supported by the operating system networking configuration. For example, the automated operating system networking configuration engine 404 in the management subsystem 212/400 may identify a fault-domain configuration provided by the storage VLAN(s) assigned to the NIC devices in the server computing device 206/306 by determining how many storage VLANs are assigned to each port. As such, with reference to the computing device configuration 310 discussed above with reference to FIG. 3B that provides the non-converged networking topology, the automated operating system networking configuration engine 404 in the management subsystem 212/400 may determine whether a different storage VLAN is assigned to each switch port 302a and 304a, which corresponds to the use of "physical" network adapter devices, or whether the same storage VLAN is assigned to each of the switch ports 302a and 304a, which corresponds to the use of "teamed" network adapter devices.

Thus, in some embodiments of block 508 the automated operating system networking configuration engine 404 in the management subsystem 212/400 may determine that an operating system networking configuration using "physical" network adapter devices in a non-converged networking topology should be provided for the operating system (e.g., a "host" operating system) utilized by the server computing device 206/306 in the computing device configuration 308. Furthermore, in some embodiments of block 508 the automated operating system networking configuration engine 404 in the management subsystem 212/400 may determine that an operating system networking configuration using "teamed" network adapter devices in a non-converged networking topology should be provided for the operating system (e.g., a "host" operating system) utilized by the server computing device 206/306 in the computing device configuration 308. Further still, those operating system networking configurations may include or enable the QoS configuration information discussed above, as well as any other configuration information retrieved during the method 500. However, while a specific example of the determination of an operating system networking configuration for a non-converged networking topology provided by a particular physical topology has been provided, one of skill in the art in possession of the present disclosure will recognize that other computing device configurations may provide a non-converged networking topology while remaining within the scope of the present disclosure as well.

In another specific example, with reference to the computing device configuration 310 discussed above with reference to FIG. 3C, the automated operating system networking configuration engine 404 in the management subsystem 212/400 may identify the physical topology provided by the connection of the switch computing device 204/302 to the server computing device 206/306 via the ports 302b and 306c, respectively, the connection of the switch computing device 204/304 to the server computing device 206/306 via the ports 304b and 306d, respectively, the connection of the switch computing device 204/312 to the server computing device 206/306 via the ports 312a and 306a, respectively, and the connection of the switch computing device 204/314 to the server computing device 206/306 via the ports 314a and 306b, respectively. With reference to the specific example of switch port configuration information provided above for the computing device configuration 310, the automated operating system networking configuration engine 404 in the management subsystem 212/400 may then determine that the physical topology for the computing device configuration 310, combined with the switch port configuration information that indicates that management VLAN(s) are provided on each of the switch ports 302b and 304b (connected to the ports 306c and 306d on the server computing device 206/306, respectively) and that the storage VLAN(s) are provided on each of the switch ports 312a and 314a (connected to the ports 306a and 306b on the server computing device 206/306, respectively), provides a non-converged networking topology for the computing device configuration 310 (e.g., because management VLAN(s) are "tagged" or otherwise assigned to the integrated NIC device in the server computing device 206/306, and the storage VLAN(s) are "tagged" or otherwise assigned to the PCIe NIC device in the server computing device 206/306).

In an embodiment, in response to determining that the computing device configuration 310 provides a non-converged networking topology, the automated operating system networking configuration engine 404 in the management subsystem 212/400 may determine whether "physical" or "teamed" network adapter devices (NIC devices) should be supported by the operating system networking configuration. For example, the automated operating system networking configuration engine 404 in the management subsystem 212/400 may identify a fault-domain configuration provided by the storage VLAN(s) assigned to the NIC devices in the server computing device 206/306 by determining how many storage VLANs are assigned to each port. As such, with reference to the computing device configuration 310 discussed above with reference to FIG. 3C that provides the non-converged networking topology, the automated operating system networking configuration engine 404 in the management subsystem 212/400 may determine whether a different storage VLAN is assigned to each switch port 312a and 314a, which corresponds to the use of "physical" network adapter devices, or whether the same storage VLAN is assigned to each of the switch ports 312a and 314a, which corresponds to the use of "teamed" network adapter devices.

Thus, in some embodiments of block 508 the automated operating system networking configuration engine 404 in the management subsystem 212/400 may determine that an operating system networking configuration using "physical" network adapter devices in a non-converged networking topology should be provided for the operating system (e.g., a "host" operating system) utilized by the server computing device 206/306 in the computing device configuration 310. Furthermore, in some embodiments of block 508 the automated operating system networking configuration engine 404 in the management subsystem 212/400 may determine that an operating system networking configuration using "teamed" network adapter devices in a non-converged networking topology should be provided for the operating system (e.g., a "host" operating system) utilized by the server computing device 206/306 in the computing device configuration 310. Further still, those operating system networking configuration may include or enable the QoS configuration information discussed above, as well as any other configuration information retrieved during the method 500. However, while a specific example of the determination of an operating system networking configuration for a non-converged networking topology provided by a particular physical topology has been provided, one of skill in the art in possession of the present disclosure will recognize that other computing device configurations may provide a non-converged networking topology while remaining within the scope of the present disclosure as well.

Figure 6D:
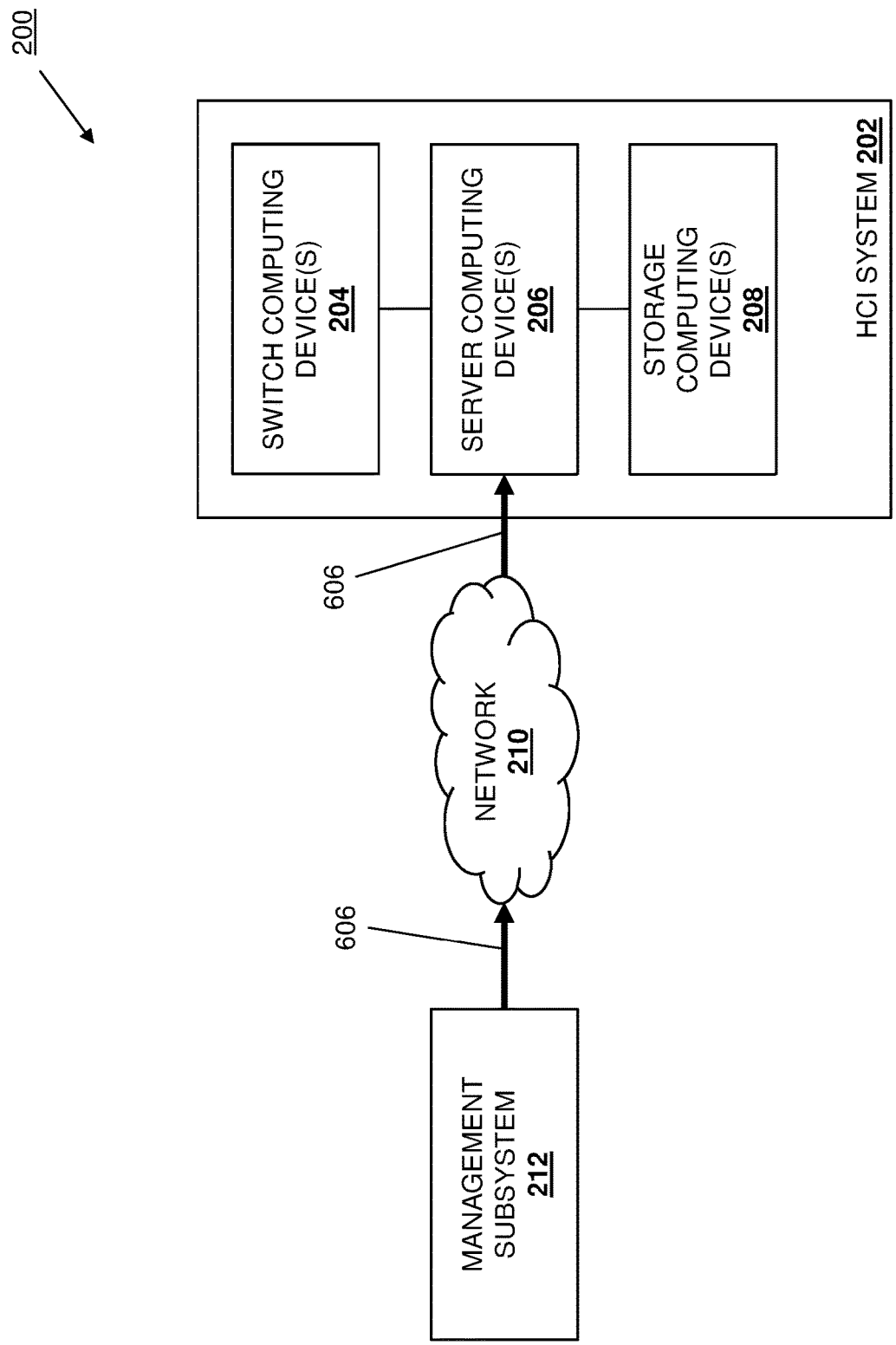
FIG. 6D is a schematic view illustrating an embodiment of the automated operating system networking configuration system of FIG. 2 operating during the method of FIG. 5.

The method 500 then proceeds to block 510 where the operating system networking configuration is provided on the server computing device. With reference to FIG. 6D, in an embodiment of block 510, the automated operating system networking configuration engine 404 in the management subsystem 212/400 may perform operating system networking configuration transmission operations 606 that may include the transmission of the operating system networking configuration determined at block 508 to the server computing device 206. However, similarly as discussed above, in some embodiments the management subsystem functionality described herein as being provided by the network-connected management subsystem 212 may instead be provided by a management controller device in the server computing device 206, and thus at block 510 that management controller device in the server computing device 206 may provide the operating system networking configuration on its server computing device 206 while remaining within the scope of the present disclosure as well.

In different examples, the transmission of the operating system networking configuration to the server computing device 206 may include the transmission of an operating system networking configuration recommendation that includes the operating system networking configuration determined at block 508 to the server computing device 206 (e.g., including host operating system networking configuration automation scripts), which allows the server computing device 206 (e.g., a management controller device in that server computing device 206) to configure its operating system networking based on that operating system networking configuration recommendation. In another example, the transmission of the operating system networking configuration to the server computing device 206 may include the automated operating system networking configuration engine 404 in the management subsystem 212/400 remotely (or locally, as discussed above) configuring the operating system networking for the operating system in the server computing device 206 based on the operating system networking configuration determined at block 508. For example, techniques for automatically configuring networking in an operating system of a computing device in a computing device infrastructure system using the operating system networking configurations determined according to the teachings of the present disclosure are described by the inventors of present disclosure in U.S. patent application Ser. No. 17/019,630, filed on Sep. 14, 2020, the disclosure of which is incorporated herein by reference in its entirety. However, while a few specific examples are provided, one of skill in the art in possession of the present disclosure will appreciate that the operating system networking configuration determined at block 508 may be provided on the server computing device 206 in a variety of manners that will fall within the scope of the present disclosure as well.

As such, following block 510, the server computing device 206/306 provided in the computing device configuration 300 discussed above with reference to FIG. 3A may have its operating system networking configured based on a fully converged networking topology. Similarly, following block 510, the server computing device 206/306 provided in the computing device configuration 308 discussed above with reference to FIG. 3B may have its operating system networking configured based on the use of "physical" network adapter devices in a non-converged networking topology if different storage VLANs are provided on its PCIe NIC device ports, or "teamed" network adapter devices in a non-converged networking topology if the same storage VLAN is provided on its PCIe NIC device ports. Similarly as well, following block 510, the server computing device 206/306 provided in the computing device configuration 310 discussed above with reference to FIG. 3C may have its operating system networking configured based on the use of "physical" network adapter devices in a non-converged networking topology if different storage VLANs are provided on its PCIe NIC device ports, or "teamed" network adapter devices in a non-converged networking topology if the same storage VLAN is provided on its PCIe NIC device ports.

Thus, systems and methods have been described that provide automated host operating system networking configuration recommendations for a host operating system in a host server computing device based on a physical networking topology of the host server computing device and its connected switch computing devices, and port configuration information retrieved from those switch computing devices. For example, the automated host operating system networking configuration system of the present disclosure includes a management subsystem coupled to a plurality of switch computing devices and a host server computing device. The management subsystem determines that the host server computing device is connected to a plurality of switch ports, identifies that the plurality of switch computing devices include the plurality of switch ports and, in response, retrieves switch port configuration information for the plurality of switch ports from the plurality of switch devices. Based on a physical topology provided by the plurality of switch computing devices connected to the host server computing device via the plurality of switch ports and the switch port configuration information for the plurality of switch ports, the management subsystem determines a host operating system networking configuration, and provides the host operating system networking configuration to the server computing device. As such, host operating system networking configurations may be determined automatically, reducing the time and costs associated with the configuration of host operating system networking in a host server computing device. Furthermore, one of skill in the art in possession of the present disclosure will appreciate that the techniques described herein may be provided as part of a switch service (e.g., an automation service) in order to provide an integrated engineered system experience.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:
1. A method for automatically configuring networking in an operating system, comprising:
  determining, by a management subsystem, that a server computing device is connected to a plurality of switch ports;
  identifying, by the management subsystem, a plurality of switch computing devices that include the plurality of switch ports;
  retrieving, by the management subsystem in response to identifying the plurality of switch devices that include the plurality of switch ports, switch port configuration information for the plurality of switch ports from the plurality of switch devices;
  determining, by the management subsystem based on a physical topology provided by the plurality of switch computing devices connected to the server computing device via the plurality of switch ports and the switch port configuration information for the plurality of switch ports, an operating system networking configuration; and
  transmitting, by the management subsystem, the operating system networking configuration to the server computing device.

2. The method of claim 1, wherein the determining that the server computing device is connected to the plurality of switch ports includes:
  identifying a respective Media Access Controller (MAC) address for each of the plurality of switch ports that is connected to at least one Network Interface Controller (NIC) device included in the server computing device;
  transmitting the respective MAC address for each of the plurality of switch ports to the plurality of switch computing devices; and
  receiving, from each of the plurality of switch computing devices in response to that switch computing device including a switch port utilizing the respective MAC address, a respective switch identifier.

3. The method of claim 2, wherein the identifying the plurality of switch devices that include the plurality of switch ports further includes:
  transmitting the respective MAC address for each of the plurality of switch ports to the plurality of switch computing devices; and
  receiving, from each of the plurality of switch computing devices in response to that switch computing device including a switch port utilizing the respective MAC address, a respective switch identifier.

4. The method of claim 1, wherein the switch port configuration information for the plurality of switch ports includes Virtual Local Area Network (VLAN) configuration information for each of the plurality of switch ports.

5. The method of claim 4, wherein the determining the operating system networking configuration includes:
  determining that the VLAN configuration information for each of the plurality of switch ports configures a management VLAN and a storage VLAN on each of the plurality of switch ports; and
  determining the operating system networking configuration for a fully-converged networking topology based on the management VLAN and the storage VLAN being configured on each of the plurality of switch ports.

6. The method of claim 4, wherein the determining the operating system networking configuration includes:
  determining that the VLAN configuration information for each of the plurality of switch ports configures a management VLAN on a first subset of the plurality of switch ports and a storage VLAN on a second subset of the plurality of switch ports; and
  determining the operating system networking configuration for a non-converged networking topology based on the management VLAN being configured on the first subset of the plurality of switch ports and the storage VLAN being configured on the second subset of the plurality of switch ports.

7. The method of claim 6, wherein the determining the operating system networking configuration for the non-converged networking topology includes:
    determining how many storage VLANs are configured on the second subset of the plurality of switch ports and:
        determining, in response to a different storage VLAN being configured on the second subset of the plurality of switch ports, the operating system networking configuration for physical network adapter devices; and
        determining, in response to a common storage VLAN being configured on the second subset of the plurality of switch ports, the operating system networking configuration for teamed network adapter devices.

8. An automated operating system networking configuration system, comprising:
    a plurality of switch computing devices;
    a server computing device; and
    a management subsystem that is coupled to the plurality of switch computing devices and the server computing device, wherein the management subsystem is configured to:
        determine that the server computing device is connected to a plurality of switch ports;
        identify that the plurality of switch computing devices include the plurality of switch ports;
        retrieve, in response to identifying that the plurality of switch computing devices include the plurality of switch ports, switch port configuration information for the plurality of switch ports from the plurality of switch devices;
        determine, based on a physical topology provided by the plurality of switch computing devices connected to the server computing device via the plurality of switch ports and the switch port configuration information for the plurality of switch ports, an operating system networking configuration; and
        transmit the operating system networking configuration to the server computing device.

9. The system of claim 8, wherein the determining that the server computing device is connected to the plurality of switch ports and the identifying that the plurality of switch computing devices include the plurality of switch ports further includes:
    identifying a respective Media Access Controller (MAC) address for each of the plurality of switch ports that is connected to at least one Network Interface Controller (NIC) device included in the server computing device;
    transmitting the respective MAC address for each of the plurality of switch ports to the plurality of switch computing devices; and
    receiving, from each of the plurality of switch computing devices in response to that switch computing device including a switch port utilizing the respective MAC address, a respective switch identifier.

10. The system of claim 8, wherein the switch port configuration information for the plurality of switch ports includes Virtual Local Area Network (VLAN) configuration information for each of the plurality of switch ports.

11. The system of claim 10, wherein the determining the operating system networking configuration includes:
    determining that the VLAN configuration information for each of the plurality of switch ports configures a management VLAN and a storage VLAN on each of the plurality of switch ports; and
    determining the operating system networking configuration for a fully-converged networking topology based on the management VLAN and the storage VLAN being configured on each of the plurality of switch ports.

12. The system of claim 10, wherein the determining the operating system networking configuration includes:
    determining that the VLAN configuration information for each of the plurality of switch ports configures a management VLAN on a first subset of the plurality of switch ports and a storage VLAN on a second subset of the plurality of switch ports; and
    determining the operating system networking configuration for a non-converged networking topology based on the management VLAN being configured on the first subset of the plurality of switch ports and the storage VLAN being configured on the second subset of the plurality of switch ports.

13. The system of claim 12, wherein the determining the operating system networking configuration for the non-converged networking topology includes:
    determining how many storage VLANs are configured on the second subset of the plurality of switch ports and:
        determining, in response to a different storage VLAN being configured on the second subset of the plurality of switch ports, the operating system networking configuration for physical network adapter devices; and
        determining, in response to a common storage VLAN being configured on the second subset of the plurality of switch ports, the operating system networking configuration for teamed network adapter devices.

14. An Information Handling System (IHS), comprising:
    a processing system; and
    a memory system that is coupled to the processing system and that includes instructions that, when executed by the processing system, cause the processing system to provide an automated operating system networking configuration engine that is configured to:
        determine that a server computing device is connected to a plurality of switch ports;
        identify a plurality of switch computing devices that include the plurality of switch ports;
        retrieve, in response to identifying the plurality of switch computing devices that include the plurality of switch ports, switch port configuration information for the plurality of switch ports from the plurality of switch devices;
        determine, based on a physical topology provided by the plurality of switch computing devices connected to the server computing device via the plurality of switch ports and the switch port configuration information for the plurality of switch ports, an operating system networking configuration; and
        transmit the operating system networking configuration to the server computing device.

15. The IHS of claim 14, wherein the determining that the server computing device is connected to the plurality of switch ports includes:
    identifying a respective Media Access Controller (MAC) address for each of the plurality of switch ports that is connected to at least one Network Interface Controller (NIC) device included in the server computing device;

transmitting the respective MAC address for each of the plurality of switch ports to the plurality of switch computing devices; and receiving, from each of the plurality of switch computing devices in response to that switch computing device including a switch port utilizing the respective MAC address, a respective switch identifier.

16. The IHS of claim 15, wherein the identifying the plurality of switch computing devices that include the plurality of switch ports further includes:

transmitting the respective MAC address for each of the plurality of switch ports to the plurality of switch computing devices; and receiving, from each of the plurality of switch computing devices in response to that switch computing device including a switch port utilizing the respective MAC address, a respective switch identifier.

17. The IHS of claim 14, wherein the switch port configuration information for the plurality of switch ports includes Virtual Local Area Network (VLAN) configuration information for each of the plurality of switch ports.

18. The IHS of claim 17, wherein the determining the operating system networking configuration includes:

determining that the VLAN configuration information for each of the plurality of switch ports configures a management VLAN and a storage VLAN on each of the plurality of switch ports; and determining the operating system networking configuration for a fully-converged networking topology based on the management VLAN and the storage VLAN being configured on each of the plurality of switch ports.

19. The IHS of claim 17, wherein the determining the operating system networking configuration includes:

determining that the VLAN configuration information for each of the plurality of switch ports configures a management VLAN on a first subset of the plurality of switch ports and a storage VLAN on a second subset of the plurality of switch ports; and determining the operating system networking configuration for a non-converged networking topology based on the management VLAN being configured on the first subset of the plurality of switch ports and the storage VLAN being configured on the second subset of the plurality of switch ports.

20. The IHS of claim 19, wherein the determining the operating system networking configuration for the non-converged networking topology includes:

determining how many storage VLANs are configured on the second subset of the plurality of switch ports and:

determining, in response to a different storage VLAN being configured on the second subset of the plurality of switch ports, the operating system networking configuration for physical network adapter devices; and determining, in response to a common storage VLAN being configured on the second subset of the plurality of switch ports, the operating system networking configuration for teamed network adapter devices.

* * * * *